Dec. 18, 1951  A. ROSENTHAL  2,578,743
METHOD OF MAKING DECORATIVE ARTICLES
Filed July 23, 1945  2 SHEETS—SHEET 1
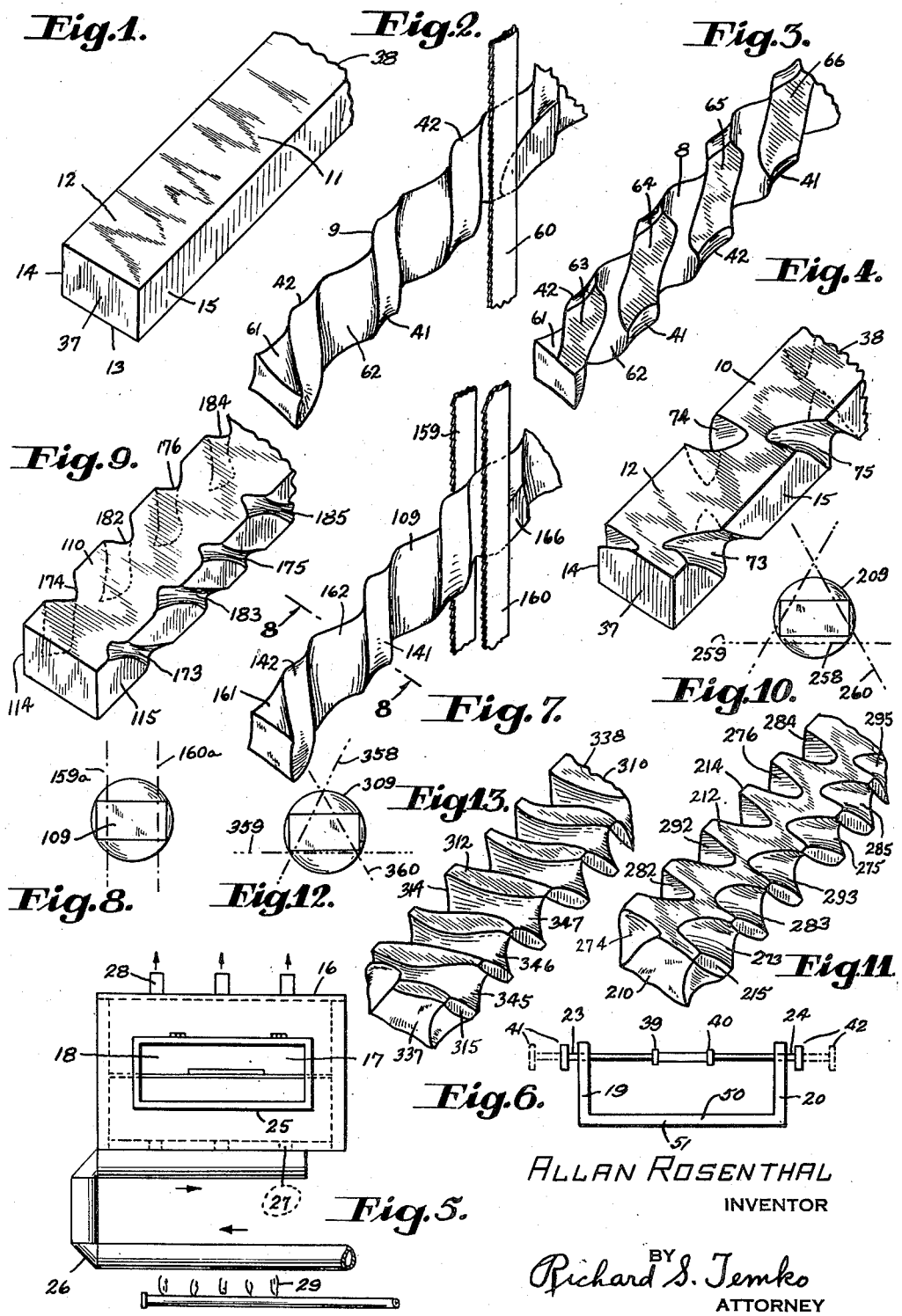
ALLAN ROSENTHAL
INVENTOR
BY Richard S. Jemko
ATTORNEY Dec. 18, 1951     A. ROSENTHAL     2,578,743
METHOD OF MAKING DECORATIVE ARTICLES
Filed July 23, 1945     2 SHEETS—SHEET 2
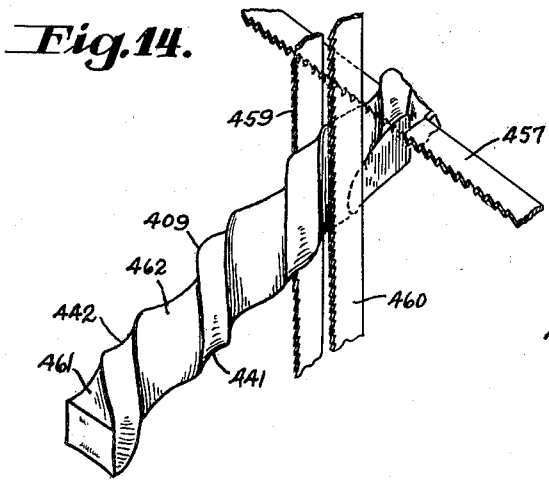
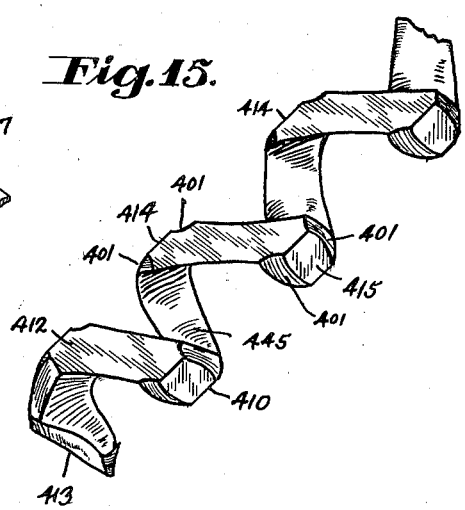
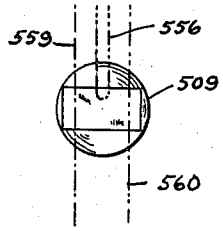
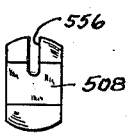
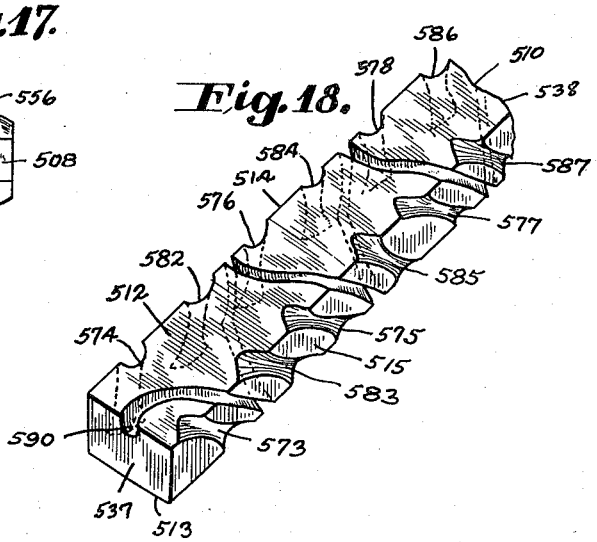
ALLAN ROSENTHAL
INVENTOR
BY Richard S. Temko
ATTORNEY Patented Dec. 18, 1951

2,578,743

UNITED STATES PATENT OFFICE 2,578,743

METHOD OF MAKING DECORATIVE ARTICLES

Allan Rosenthal, Brooklyn, N. Y.

Application July 23, 1945, Serial No. 606,666

6 Claims. (Cl. 18—47.5)

This invention relates generally to decorative materials and more particularly to a novel and useful method of making a decorative article composed of thermoplastic material.

In the decorative arts there has been a great increase in the use of thermoplastic materials which are formed under heat into various decorated useful articles. Such articles have had a wide use and sale, particularly when the material of which they were composed was of a transparent nature so that the light reflecting and refracting characteristics thereof were taken advantage of.

Rod-like forms have presented problems in the large scale, low cost production thereof because of the large amount of hand-tooling and hand-polishing required. This difficulty is particularly apparent in faceted structures where the individual facets or reflecting surfaces required individual cutting, polishing or burnishing to produce the desired light reflecting or refracting characteristics. Another disadvantage flowing from the use of pre-formed rods or tubing and then decorating the same by additional surface incising or abrading treatment, lies in the considerable amount of machinery necessary to produce the rod or tube forms or the considerable expense of the provision of a plurality of differently sized dies when the articles are cast. Furthermore, if the material so formed is to be readily adapted for meeting various problems of decoration or the fabrication of a multiplicity of articles, considerable inventories of the various rod diameters must be maintained in stock.

Such disadvantages have been overcome in the present invention by the fact that the effective external diameter of the finished product may be quickly and easily varied by adjustments in the width and thickness in the blank from which the decorative articles are formed.

It is, therefore, among the principal objects of the present invention to provide a method for producing decorative articles which produces a superior article from a decorative standpoint and one which is more durable and which may be produced in relatively large quantities at low cost.

Another object of the present invention lies in the production of articles of the class described which may be easily varied during the fabrication thereof to produce a variety of decorative results both in color and texture.

Another object herein lies in the production of articles of the class described and of the methods of making the same by virtue of which a very great number of different surface decorations are obtainable with the minor adjustment of relatively simple cutting tools.

Another object herein lies in the provision of a method of fabricating decorative articles composed of certain types of thermoplastic material of an elastic nature wherein advantage is taken of the elasticity of the material.

These objects and other incidental ends and advantages will more fully appear in the progress of this disclosure and be pointed out in the appended claims.

Applicant's copending application for patent, Serial No. 588,971 pertains to broadly related subject matter. This application relates to the production of generally elongated shapes of unusual character.

While the specification refers to thermoplastic materials, other materials which are moldable or formable and which will retain the new form when set, may be considered as equivalents. Thus a so called thermosetting material during the molding or forming stage is in fact thermoplastic since it can be changed in shape while heated. The fact that when set, the thermosetting material cannot be resoftened does not affect the general usefulness of the present method and products. Similarly, partially polymerized plastic compounds, or incompletely vulcanized hard rubber may be used. Other plastic moldable materials having sufficient tensile strength may be used, such as those which are plastic or formable at normal temperatures (for example 70°), and which will set by the action of heat. Ceramic materials are of this character, and after molding they are set or vitrified, by the action of heat. Other substances which will set by oxidation may be used, such as putties, but they must be stretchable in the forming stage. Annealed metals may be subjected to my process and then subsequently hardened.

In the drawings, similar reference characters designate corresponding parts throughout the several views of each embodiment.

Figure 1 is a fragmentary view in perspective of a blank strip of material in the first stage of its fabrication in accordance with the present invention.

Figure 2 is a fragmentary view in perspective showing the blank strip of Figure 1 during the third step of the herein disclosed method.

Figure 3 is a view of the strip of material shown in Figure 2, after the cutting operation has been performed with the part slightly rotated in a counter clockwise direction.

Figure 4 is a fragmentary view in perspective showing the strip of Figure 1 in the final step of fabrication, a product of the method in the first embodiment of the invention.

Figure 5 is a front elevational view showing the blank strip of Figure 1 on a reduced scale during a second stage in the present method of manufacture with an associated apparatus therefor.

Figure 6 is a front elevational view showing the blank strip on a reduced scale in the course of the third stage in the present method of manufacture with associated apparatus therefor.

Figure 7 is a fragmentary view in perspective of the blank during the fourth stage of the method in the second form of the first embodiment of the invention.

Figure 8 is a sectional view, somewhat schematic as seen from the plane 8—8 on Figure 7.

Figure 9 is a fragmentary view in perspective of the decorative article, a product of the method in the second form of the first embodiment of the invention.

Figure 10 is a sectional view corresponding generally to Figure 8 but showing a third form of the first embodiment of the invention.

Figure 11 is a fragmentary view in perspective of the decorative article, a product of the method in the third form of the first embodiment of the invention.

Figure 12 is a sectional view corresponding generally to Figure 8 but showing the fourth form of the first embodiment of the invention.

Figure 13 is a fragmentary view in perspective of the decorative article, a product of the method in the fourth form of the first embodiment of the invention.

Figure 14 is a fragmentary view in perspective, corresponding generally to Figure 2, but showing the third stage in the fabrication of the second embodiment of the invention.

Figure 15 is a fragmentary view in perspective of the decorative article, a product of the method in the second embodiment of the invention.

Figure 16 is a schematic sectional view corresponding generally to Figure 8 and showing the blank in the third stage of the method in the third embodiment of the invention.

Figure 17 is a sectional view corresponding generally to Figure 16 with the parts which have been cut away during the operation indicated schematically in Figure 16, removed.

Figure 18 is a fragmentary view in perspective of a decorative article, a product of the method in the third embodiment of the invention.

Turning now to the first form of the first embodiment of the invention illustrated in Figures 1 to 4 inclusive, the decorative article generally indicated by reference character 10 is preferably formed from a single blank or strip 11 composed of thermoplastic material. For the purpose of avoiding unnecessary repetition in connection with this disclosure, the specification may mention the thermoplastic material, methyl-methacrylate, sold under trade-marks such as "Lucite" or "Plexiglas," but it will be understood by those skilled in the art to which the present invention relates, that other thermoplastic materials may be used. Furthermore, such thermoplastic materials may be transparent, translucent or opaque and they may be homogeneous or may consist of incomplete mixtures of a plurality of different kinds of thermoplastic materials. As will more fully appear in the progress of this disclosure, the ornamental effect of the decorative article 10 is enhanced when the blank 11 is composed of a transparent or translucent material since the light reflecting and refracting properties of the thermoplastic material under such circumstances, are taken advantage of.

Turning to Figure 1, the blank 11 may be of any suitable size, depending upon the dimensions which it is desired that the finished product 10 shall have. The blank 11 may either be a prefabricated strip of the size and shape shown or the same may be cut from a larger piece of the raw material. Where, for example, the base material of which the blank 10 is composed, is a cast synthetic resin, the blank or strip 11 may be severed from a larger cast slab.

As contrasted with prior art methods of handworking, irregular plastic shapes in which the configuration of the article is altered by machining and polishing when in an almost finished state, in the present method the blank 11 may be given some surface decoration which it may be desired to give it, while the blank is in a flat and regular shape. Thus, the top surface 12, the bottom surface 13, and side edge surfaces 14 and 15 may at this time receive any desired decorative treatment. Such treatment, for example, would include buffing to a high polish; frosting produced by using abrasives of varying degrees of fineness; fuming by the use of volatile materials adapted to affect the surface of the particular material of which the blank 11 is composed; full or partial lacquering or coating, producing predetermined surface irregularities by suitable rolling or stationary dies with heat and pressure, and the like. In the fabrication of the article 10, it is desirable, however, that such surface treatments as have been imparted to the blank 11, be not of such high degree as to destroy the general configuration thereof so as to destroy the general configurative effect of the article 10.

Next, the blank 11 is subjected to the action of heat. This may be done in a suitable oven. Such an oven is shown in Figure 5 in which the oven body 16 may be composed of suitable insulating material and may be provided with a viewing opening 17, the latter in turn being closed by a transparent plate 18. The body 16 may be provided with a door 25 for the insertion or removal of the material being treated. Heat to the oven may be supplied by air passing upwardly through the conduit 26 and upwardly through the openings 27, over the blank 11 and out through the flues 28. The air within the conduit 26 may be heated in any suitable manner, as for example by the gas flames 29.

After the blank 11 has been subjected to the action of the heated air just described, a length of time sufficient to cause it to reach a temperature at which it becomes softened, the blank 11 is removed from the oven and placed in the twisting and stretching device 50. The device 50 may include a base 51 and end wall members 19 and 20 which act as bearings for axle rods 23 and 24.

It is desirable that the blank remain at a sufficiently high temperature to keep the blank softened during the twisting and stretching operations. When the latter operations are carried out promptly after removal of the blank from the oven, no additional heating is required.

In placing the heated and softened blank 11 in the device 50 the ends 37 and 38 are grasped within suitable clamps or chucks therefor, said chucks being indicated by reference characters 39 and 40 (see Figure 6). The chucks 39 and 40 are secured to the rods 23 and 24, respectively, and said rods at the extremities thereof, are provided with the rotating means 41 and 42. The rotating means 41 and 42, in the case of manual operation of the process, may be ordinary handwheels. Where desired, however, the wheels may be power driven in any suitable manner, both as to rotation with respect to each other and as to movement outwardly with respect to each other.

With the blank 11 in a softened state and in the form shown in Figure 1 and engaged by the chucks 39 and 40, the chucks 39 and 40 are rotated in opposite directions about an axis penetrating the rods 23 and 24 and at the same time, the chucks 39 and 40 may be moved outwardly away from each other. Obviously, assuming that the heat, and therefore the plasticity of the mass between the chucks 39 and 40 may be maintained uniformly, a corresponding effect will be obtained by the rotation of only one of the chucks 39 or 40 and the movement of only one of said chucks away from the other.

As a result of the torsion step and with or without the stretching step just described, the side edges 14 and 15 take on a helical spatial arrangement, as shown in Figure 2. Obviously, the relative average diameter of the article 10 will be affected by the degree of stretching to which the plastic mass is subjected and the greater the pull, the finer it becomes drawn. The degree of pulling or elongation of the mass in its plastic state will also affect the pitch of the primary flutes generally indicated by reference characters 41 and 42, which are formed by the side edges 14 and 15 as now distorted. The number of complete rotations of one of the ends 37 or 38 with respect to the other, will also affect pitch and configuration of the flutes 41 and 42.

When the decorative article 10 has assumed the desired shape, the mass is permitted to congeal, the chucks 39 and 40 being maintained in fixed position during the cooling. After sufficient cooling, the rod like twisted blank 9 is complete.

It is important to note at this point, that after the plastic mass has hardened, no additional polishing or buffing is required to be performed on the blank 9. This is so because only sufficient heat has been utilized during the forming steps to permit the stretching and twisting operation. Not enough heat has been used to cause a substantial change in the relatively exposed surfaces of the article 10.

Because of the many variable factors involved, such as: the relative plasticity of the raw material of the blank 11 at a given temperature; the length, width and thickness of the blank, each with respect to the others; the amount of twisting; and the amount of stretching; the shape shown in Figures 2 to 4 inclusive, should be considered as exemplary.

With the blank 9 generally in the condition shown in Figure 2, next a cut longitudinally of the blank 9 is taken in any suitable manner as by the use of a rotary or band saw. In Figure 2 the band saw is indicated by reference character 60. The cut is preferably laterally displaced with respect to the longitudinal central axis of the blank 9. As shown in Figure 2 the cut is adapted to remove, alternatively, portions of the flutes 41 and 42. Located between the primary flutes 41 and 42 are the secondary flutes 61 and 62 which are formed from the upper and lower surfaces 12 and 13 respectively. Where the top and bottom surfaces 12 and 13 are wider than the side edge surfaces 14 and 15, these secondary flutes 61 and 62 will be wider than the primary flutes. The cut made by the blade 60, therefore, does take varying amounts away from the secondary flutes, although in the example shown in Figures 2 and 3 the secondary flutes are not completely bridged and this will result in the indentations or notches in the finished piece not joining each other (see Figure 4). With the blank in Figure 9 slightly rotated, the same may appear as shown in Figure 3 providing the flats 63-66 inclusive. This blank is indicated by reference character 8.

Next the blank 8 is replaced in the oven 16 and heated until it becomes soft enough. This degree of softness is determined by the particular material being used. In the case of a plastic having similar physical characteristics to methyl methacrylate, such temperature need only be sufficient for the material to perform under what I have chosen to call a condition of elastic memory, at which time the blank 8 completely untwists to take the same general shape it had in the beginning, or as shown in Figure 1. The cutouts produced by the cut of the blade 60 produce a series of notches 73-75 inclusive and the depth of these notches will depend upon the depth of the cut made by the blade 60. The angularity of the notches or indentations 73-75 will depend upon the degree of twisting and stretching to which the blank 11 had been subjected to produce the blank 9. By virtue of the twisting, even though the cuts produced by the blade 60 are flat, producing the flats 63-66, when the blank 8 untwists to form the decorative article 10, the notches 73-75 are curved and graceful and look as though they have been placed by hand sculpture or modeling. If the flats 63-66 have been left in a rough state, the saw cut produces frosted or matte surfaces in the notches 73-75. Where a completely shiny piece is desired, the flats 63-66 may be polished or buffed.

Where the plastic material of which the blank 8 is composed is one which does not have the characteristic of elastic memory, to which I have referred above, then after the blank 8 has been softened, it may be replaced into the device 50 and unwound to its original generally planar condition. Here again the appearance may be similar to that shown in Figure 4.

Turning now to the second form of the first embodiment of the invention illustrated in Figures 7, 8, and 9, for the purpose of avoiding needless repetition parts corresponding to the first form are given the same reference characters with the addition of the prefix "1." This form differs from the first form only in the addition of another cut oppositely disposed with respect to the first cut made by the saw blade 160. Thus the blade 159 produces an opposite set of flats (not seen as such in the drawings) the blank 109 after having the two parallel cuts taken, said cuts being indicated schematically by the dot-dash lines 160a and 159a on Figure 8, being twisted to its original general outline to take the appearance of the decorative article 110 in Figure 9. This method produces double the number of notches or indentations as that produced in the first form so that, for example, along the side edge surface 115 between the notches 173 and 175 are another set of notches 183 and 185. Similarly, on the opposite side surface 114 between the notches 174 and 176 are another set of notches 182 and 184.

In the third form of the first embodiment shown in Figures 10 and 11 the number of cuts taken longitudinally of the blank 209 is increased to three and the cuts are indicated schematically by the dot-dash lines 260, 259 and 258. Upon unwinding, the blank forms the decorative article 210 shown in Figure 11. Thus along the side wall surfaces 214 and 215 there are the notches 273, 275 and 283, 285, and 293, 295; and on the opposite surface 214 there are the notches 274, 276, 282, 284, and 292. Other parts, for the avoidance of repetition, are given the same reference characters as the first form with the addition of the prefix "2."

In Figures 12 and 13, a fourth form of the first embodiment is shown and this differs from the third form in that the cuts join each other in the area of the secondary flutes of the blank. Since these cuts thus enter the central cylindrical core of the blank they flow into each other when the blank is twisted back to its original shape to form a set of three spaced and parallel tertiary flutes indicated by the reference characters 345, 346 and 347, the secondary flute having been removed when the blank is twisted back to its original generally block shape.

For the avoidance of unnecessary repetition other parts corresponding to the prior described forms are given the same reference characters with the addition of the prefix "3."

The number of cuts corresponding to the cuts 60, or 160, 159, or 260, 259, and 258, or 360, 359, and 358 may be indefinitely increased so that an indefinite number of polygonal shapes may be given to the blank after the first twisting operation. When the number is unduly increased, the polygonal flats corresponding to the flats 63–66 will merge to form a circle and the notches will also merge to merely round the side wall surfaces corresponding to 14 and 15. Where the cuts merge with each other in the area of the secondary flutes with an increase in the number of sides of the polygon, the remaining portions of the side and top and bottom surfaces of the blank become cut away and the decorative effect of my method becomes substantially lessened. Thus it becomes apparent that the number of notches which is a function of the number of cuts is a matter of choice and when the polygonal sides or flats are increased, they flow into each other to completely remove the original side wall surfaces corresponding to the side wall surfaces 14 and 15 with a consequent decrease in the depth and size of the individual notches.

Turning now to the second embodiment of the invention illustrated in Figures 14 and 15, again for the purpose of avoiding repetition, parts corresponding to the first embodiment, are given the same reference characters with the addition of the prefix "4." Thus the blank 499 may not only be cut at the sides thereof corresponding to that shown in Figure 7, but may also be split lengthwise along a plane substantially at right angles to the directions of the cuts produced by the saw blades 460 and 459. In Figure 14 the relatively transverse or horizontally disposed blade is indicated by reference character 457. After the cut has been made by the blade 457 which longitudinally bisects the blank, upon untwisting, each of the halves takes a form shown in Figure 15. The original top and bottom surfaces 412 and 413 are restored as well as the side surfaces 414 and 415. A deep spiral channel 445 is also formed. The side cuts produced by the blades 459 and 460 cause the facets 401 and these may be eliminated by the elimination of the cuts produced by said blades.

Turning now to the third embodiment of the invention illustrated in Figures 16–18 inclusive, here again for the purpose of avoiding repetition, parts corresponding to the first embodiment are given the same reference characters with the addition of the prefix "5."

The blank 509 as indicated schematically in Figure 16 in its twisted state, is given two lateral cuts similar to that shown in Figure 7 and in addition a longitudinally extended slot 556 is cut into the twisted blank. Upon untwisting the decorative article 510 is produced which not only has the notches 573, 583, 575, 585, 577 and 587 on the side surface 515, and the notches 574, 582, 576, 584, 578, and 586, but also a helical flute 590. The flute 590 is produced by the cut 556 and although helical in the finished product is produced by cutting into, such as by milling or sawing, the twisted blank, a substantially rectilinear cut or groove.

It may thus be seen that I have disclosed novel and useful decorative articles and methods of making the same wherein such articles may be produced in large quantities at relatively low cost. The finished article presents a highly desirable appearance and has many utilitarian aspects outlined hereinabove.

I wish it to be understood that I do not desire to be limited to the exact details of construction shown and described, for obvious modifications will occur to a person skilled in the art.

I claim:

1. The method of manufacturing a decorative article including the steps of: providing an elongated block shaped blank of plastic material, said blank having ends, a top surface, a bottom surface, a pair of side edges, and opposed pairs of upper and lower corner edges; softening said blank; twisting said blank about its longitudinal axis; grooving said blank generally in the direction of said axis; heating said blank; and twisting said blank in a direction opposite to the said first mentioned twisting.

2. The method of manufacturing a decorative article including the steps of: providing an elongated blank of plastic material; softening said blank; twisting said blank about its longitudinal axis; making a plurality of cuts in the general direction of said axis in the blank while the blank is in a twisted state; and twisting said blank about its longitudinal axis in a second direction opposed to said first mentioned direction thereby returning said blank to its approximate original shape.

3. The method of manufacturing a decorative article including the steps of: providing a blank of plastic material; said material having the property of elastic memory; softening said blank; twisting said blank about an axis; cutting off a portion of said blank, said cut being made in substantially the same direction as said axis; heating said blank to such temperature and for such time as to enable the elastic memory of the material to change the shape of the blank.

4. The method of manufacturing a decorative article including the steps of: providing an elongated blank of plastic material of a type having the property of elastic memory; softening said blank; twisting said blank about an axis therein while said blank is in a softened condition; cooling said blank to cause the same to assume a hardened condition; cutting said blank in a direction substantially the same as said axis; and heating said blank to such temperature and for such time as to enable the elastic memory of the material to change the shape of the blank.

5. The method of manufacturing a decorative article including the steps of: providing an elongated block-shaped blank of plastic material of a type having the property of elastic memory, said blank having ends, a top surface, a bottom surface, a pair of side edges, and opposed pairs of upper and lower corner edges; softening said blank; twisting said blank about its longitudinal axis; grooving said blank generally in a direction of said axis; and heating said blank to such temperature and for such time as to enable the elastic memory of the material to change the shape of the blank.

6. The method of manufacturing a decorative article including the steps of: providing an elongated blank of plastic material having the property of elastic memory; softening said blank; twisting said blank about its longitudinal axis; making a plurality of cuts in the general direction of said axis in the blank while the blank is in a twisted state; and heating said blank to such temperature and for such time as to enable the elastic memory of the material to change the shape of the blank.

ALLAN ROSENTHAL.

REFERENCES CITED

The following references are of record in the file of this patent:

UNITED STATES PATENTS

| Number | Name | Date |
| --- | --- | --- |
| 2,149,066 | Orsini | Feb. 28, 1939 |
| 2,153,663 | Foster | Apr. 11, 1939 |
| 2,324,748 | Welch | July 20, 1943 |
| 2,336,100 | Jacque | Dec. 7, 1943 |
| 2,358,304 | Cogsdill | Sept. 19, 1944 |
| 2,368,085 | Barbieri | Jan. 30, 1945 |
| 2,377,042 | Rosenthal | May 29, 1945 |
| 2,377,928 | Fielitz et al. | June 12, 1945 |